April 13, 1954 W. D. POUCHOT 2,674,845
DIFFUSER APPARATUS WITH BOUNDARY LAYER CONTROL
Filed May 2, 1951
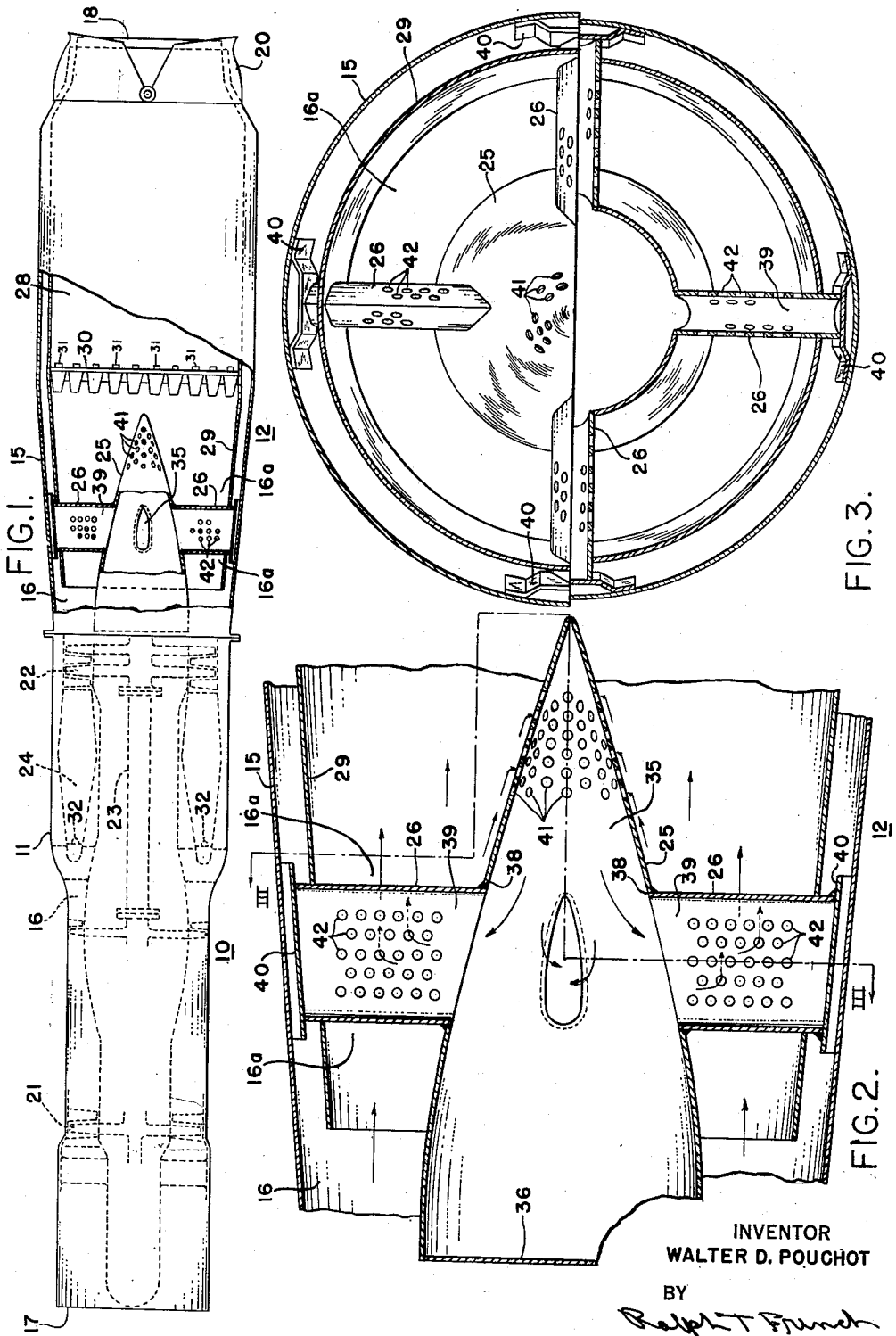
INVENTOR
WALTER D. POUCHOT
BY
ATTORNEY

UNITED STATES PATENT OFFICE 2,674,845

DIFFUSER APPARATUS WITH BOUNDARY LAYER CONTROL

Walter D. Pouchot, Prospect Park, Pa., assignor, by mesne assignments, to the United States of America as represented by the Secretary of the Navy Application May 2, 1951, Serial No. 224,209

3 Claims. (Cl. 60—35.6)

This invention relates to fluid motivating power plant apparatus and more particularly to an aviation power plant of the jet propulsion class.

In designing high velocity fluid motivating apparatus, such as an afterburner for an aviation turbojet engine, it may be desirable to provide wall structure forming an annular diverging passage, or diffuser, such as a diffuser passage disposed downstream of a gas turbine, in which the turbine exhaust gases are allowed to expand for effecting reduction in flow velocity and corresponding increase in static pressure of the gases prior to further combustion of afterburner fuel therein for augmenting the available thrust at the jet nozzle. In one well known type of turbojet construction, such a diffuser passage is defined between an outer cylindrical wall of the afterburner and a centrally disposed conical fairing that is supported within the wall by means of hollow radial struts.

It is known that in such an expanding passage or diffuser, the boundary layer of fluid moving therethrough may tend to separate from the wall structure at critical points in the passage, thereby creating undesired flow characteristics conducive to losses in total pressure and in general negating the desired function of the diffuser. It has consequently been proposed to effect removal of boundary layer air at critical areas of the diffuser walls by bleeding such air through suitably disposed apertures in the walls.

One object of the present invention is the provision of diffuser structure for an afterburner having improved means for bleeding boundary layer air and for returning such air to the motivating gas stream without substantial loss of energy.

It is another object of the invention to provide afterburner diffuser structure including a hollow fairing cone supported on hollow struts radially disposed within an outer cylindrical wall, the fairing cone having boundary layer air bleed apertures which communicate through the fairing cone and struts with discharge outlets formed in the latter, whereby the air may be returned to the main body of motive gases economically and at points remote from the critical flow surfaces of the fairing cone.

These and other objects are effected by the invention as will be apparent from the following description and claims taken in connection with the accompanying drawing, forming a part of this application, in which:

Fig. 1 is a diagrammatic longitudinal view, partly in section, of an aviation gas turbine power plant including afterburner equipment and constructed in accordance with the invention;

Fig. 2 is a fragmentary sectional view, in enlarged detail, of the diffuser portion of the apparatus shown in Fig. 1; and Fig. 3 is a sectional view taken along the line III—III of Fig. 2.

As shown in Fig. 1 of the drawing, a typical aircraft turbojet power plant may comprise a gas turbine engine 10 having a generally cylindrical outer casing 11, and an afterburner 12 having a casing structure 15 suitably bolted to the engine casing 11. The casing sections of the power plant thus provide a continuous flow passageway generally indicated by the reference character 16, which extends from an air inlet 17 formed in the engine casing 11, to a rearwardly directed gas discharge nozzle 18 formed in the casing structure 15 of the afterburner and having a flow area that is variable by adjustment of movable nozzle gate apparatus 20. The usual operating elements of the engine 10 are disposed in generally axial alignment in the casing 11 and include an axial flow compressor 21, a gas turbine 22 operatively connected thereto by means of a shaft 23, and annular main combustion apparatus 24 which is interposed in passageway 16 between the compressor discharge and the turbine inlet.

The end of the afterburner casing structure 15 adjacent the turbine exhaust end of the engine casing structure 11 is adapted to support a substantially conical fairing 25 through the medium of a number of circumferentially spaced, radially disposed hollow struts 26. Mounted in the afterburner casing structure is a tubular liner 29, which with the fairing 25 defines an annular diffuser portion 16a of the through passage 16. The annular diffuser passage 16a merges into an afterburner combustion chamber indicated by the reference character 28, in which is mounted a flameholder device 30 and suitable afterburner fuel nozzles 31, the latter being adapted to be supplied with fuel through the medium of an afterburner fuel control system (not shown), when thrust augmentation is desired.

In operation, air entering the inlet 17 of the engine 10 is compressed and delivered by the compressor 21 to the combustion apparatus 24, where fuel continuously emitted from a plurality of nozzles 32 is initially ignited by electrical means (not shown) and burned to provide hot combustion gases for driving the turbine 22. If the afterburner 12 is not in operation, the gases expanded through the turbine may be conducted in unchanged state through the afterburner and expelled by way of the nozzle 18 in the form of a jet establishing a propulsive thrust sufficient for normal cruising service. In operation of the afterburner to provide increased thrust, however, the usual afterburner fuel system (not shown) becomes operative to supply fuel into the turbine exhaust gases, which include sufficient residual air to support further combustion and release of additional energy within the combustion chamber 28, thereby augmenting the thrust at the nozzle 18.

As shown in Fig. 2, in which the upstream end of the afterburner apparatus 12 is represented in greater detail, the hollow fairing 25 is substantially conical in form, and forms an interior chamber 35 which may be closed at the larger upstream end, adjacent the turbine, by a wall 36. Intermediate the ends of the fairing 25 apertures 38 are formed therein for receiving the respective inner ends of the hollow radial struts 26, which may be welded or otherwise suitably secured to the fairing. Each of the struts 26 extends through an opening in the liner 29 and encloses a chamber 39, which communicates at one end with the fairing chamber 35 and is closed at the opposite end by a flanged carrier plate 40 that is suitably welded or riveted to the outer casing structure 15, outwardly of the liner 29.

According to the invention, the converging or tapered wall of the fairing 25 downstream of the struts 26 has formed therein a plurality of bleed ports 41, which are disposed in a critical boundary layer air zone and are adapted to facilitate withdrawal of sufficient boundary layer air to minimize any tendency toward reduction in velocity or separation of the high velocity air stream from the diffuser surface of the fairing 25. For effecting return to the main air stream of the air thus bled from the boundary layer flowing over the fairing, a plurality of discharge ports 42 are formed in each of the struts 26 at points remote from the ports 41. Preferably, the struts 26 have airfoil contours, and have the discharge ports 42 formed in the lateral wall portions thereof.

It will thus be seen that, since the flow area of the diffuser portion 16a of passage 16 defined between the liner 29 and fairing 25 increases in area from the upstream inlet toward downstream exit thereof, the static pressure of gases in the region of the bleed ports 41 will under operative conditions be sufficiently increased relative to the static pressure in the region of the struts 26 to cause flow of part of the boundary layer air through the bleed ports 41 into chamber 35 within the fairing, and thence back into the main air stream by way of the chambers 39 and discharge ports 42 of the respective struts 26. With boundary layer gases thus withdrawn from the downstream end of the fairing and returned to the main gas stream at remote points, the energy represented by such gases is conserved and becomes available for further reaction in the afterburner combustion chamber. At the same time, reintroduction of the withdrawn gases into the main gas stream is accomplished without possible counteraction or interference thereof with the normal flow of boundary layer gases along the surface of the diffuser passage constituted by the fairing 25, such as might result from an attempt to reintroduce such gases farther upstream but adjacent the same diffuser surface.

While the invention has been shown in but one form, it will be obvious to those skilled in the art that it is not so limited, but is susceptible of various other changes and modifications without departing from the spirit thereof.

What is claimed is:
1. In a gas motivated power plant, substantially cylindrical outer wall structure, inner fairing structure having a rearwardly converging exterior surface and coaxially disposed within said wall structure to provide a rearwardly diverging annular diffuser passage adapted to conduct a high velocity stream of gas under pressure, said fairing structure having formed therein an interior chamber and a plurality of bleed ports providing communication thereto from a downstream region of said diffuser passage having relatively large flow area, a plurality of radially disposed supporting struts secured to said wall structure and to said fairing structure at points upstream of said bleed ports therein, at least one of said struts having an interior passage communicating with said chamber in said fairing structure, and a plurality of discharge ports formed in each of said struts, said discharge ports being remote from said bleed ports and communicating with said diffuser passage in an upstream region of relatively small flow area, the differential between static pressures of gas in the respective downstream and upstream regions of the diffuser passage serving to effect withdrawal of boundary layer gas away from the exterior surface of said fairing structure through said bleed ports, and return of such gas to the main gas stream by way of said discharge ports.

2. In a turbojet power plant including gas turbine means and afterburner apparatus disposed downstream thereof for receiving gas exhausted from said turbine; substantially cylindrical outer wall structure, substantially conical inner fairing structure coaxially disposed adjacent the exhaust side of said turbine means and serving with said outer wall structure to form a rearwardly diverging annular diffuser passage for conducting turbine exhaust gas to said afterburner apparatus, said conical fairing structure being hollow and having a plurality of bleed ports formed in the tip portion thereof in a downstream region of said diffuser passage having relatively large flow area, a plurality of radially disposed hollow struts supporting said fairing structure from said wall structure, said hollow struts being connected to said hollow fairing structure at points upstream of said bleed ports and having a plurality of discharge ports formed therein for communication with said diffuser passage in a region of relatively small flow area, whereby the increase in static pressure of gas expanding into the relatively large downstream portion of said diffuser passage becomes operative to effect inward flow of boundary layer gas through said bleed ports in the tip portion of said hollow fairing structure and return flow into said diffuser passage by way of said discharge ports in said hollow struts, the boundary layer gas thus withdrawn from the surface of the fairing structure being introduced into the main gas stream at points remote from said surface.

3. Apparatus as set forth in claim 2 in which the struts are of airfoil contour and the discharge ports are formed in the lateral walls of the struts.

References Cited in the file of this patent
UNITED STATES PATENTS

| Number | Name | Date |
|---|---|---|
| 2,405,768 | Stalker | Aug. 13, 1946 |
| 2,483,401 | Cole | Oct. 4, 1949 |
| 2,555,576 | Criqui | June 5, 1951 |
| 2,587,227 | Roy | Feb. 26, 1952 |
| 2,594,042 | Lee | Apr. 22, 1952 |